(12) United States Patent
Ozawa

(10) Patent No.: US 8,213,062 B2
(45) Date of Patent: Jul. 3, 2012

(54) IMAGE READING APPARATUS

(75) Inventor: Junya Ozawa, Minamikoma-gun (JP)

(73) Assignee: Nisca Corporation, Minamikoma-Gun, Yamanashi-Ken (JP)

( * ) Notice: Subject to any disclaimer, the term of this patent is extended or adjusted under 35 U.S.C. 154(b) by 476 days.

(21) Appl. No.: 12/457,723

(22) Filed: Jun. 19, 2009

(65) Prior Publication Data

US 2009/0316226 A1 Dec. 24, 2009

(30) Foreign Application Priority Data

Jun. 23, 2008 (JP) ................................. 2008-163074

(51) Int. Cl.
*H04N 1/04* (2006.01)
(52) U.S. Cl. ........ 358/497; 358/474; 358/482; 358/483; 250/234; 250/208.1; 399/212
(58) Field of Classification Search .................. 358/471, 358/474, 497, 494, 400, 401, 483, 482, 500, 358/501, 505, 514
See application file for complete search history.

(56) References Cited

U.S. PATENT DOCUMENTS

| | | | | | |
|---|---|---|---|---|---|
| 4,862,218 | A | * | 8/1989 | Tsunoda et al. | ............... 399/118 |
| 5,281,994 | A | * | 1/1994 | Fukuda et al. | .................. 355/66 |
| 5,585,627 | A | * | 12/1996 | Akutsu et al. | .................. 250/234 |
| 6,028,682 | A | * | 2/2000 | Ott et al. | ......................... 358/497 |
| 6,879,413 | B1 | * | 4/2005 | Hayashi et al. | ............... 358/474 |
| 7,095,535 | B2 | * | 8/2006 | Ogata | ............................. 358/475 |
| 7,154,643 | B2 | * | 12/2006 | Chang et al. | ................... 358/497 |
| 7,310,171 | B2 | * | 12/2007 | Huang et al. | ................... 358/474 |
| 7,378,644 | B2 | * | 5/2008 | Kubota et al. | ................. 250/234 |
| 2010/0328736 | A1 | * | 12/2010 | Ozawa | ........................... 358/494 |

FOREIGN PATENT DOCUMENTS

| | | |
|---|---|---|
| JP | H01-18868 | 1/1989 |
| JP | H04-204910 | 7/1992 |
| JP | H11-352603 | 12/1999 |
| JP | 2001-7996 | 1/2001 |
| JP | 2001-222075 | 8/2001 |
| JP | 2004-072538 | 3/2004 |

* cited by examiner

*Primary Examiner* — Cheukfan Lee
(74) *Attorney, Agent, or Firm* — Manabu Kanesaka

(57) ABSTRACT

An image reading apparatus has a platen, first and second carriages, a light source supported on the first carriage, a first mirror to deflect reflected light from the original document toward the second carriage, one or more second mirrors supported on the second carriage to guide the light from the first mirror to image reading device, and rail members. The first carriage has first and second mirror support portions for supporting one side edge portion of the first mirror by two points, and a third mirror support portion for supporting the other side edge portion by one point. The first carriage is supported slidably at its opposite side edge portions respectively on the rail members via slide members disposed at four right and left places including two front and back places, and a height position is adjustable for supporting the first mirror by one point.

6 Claims, 5 Drawing Sheets

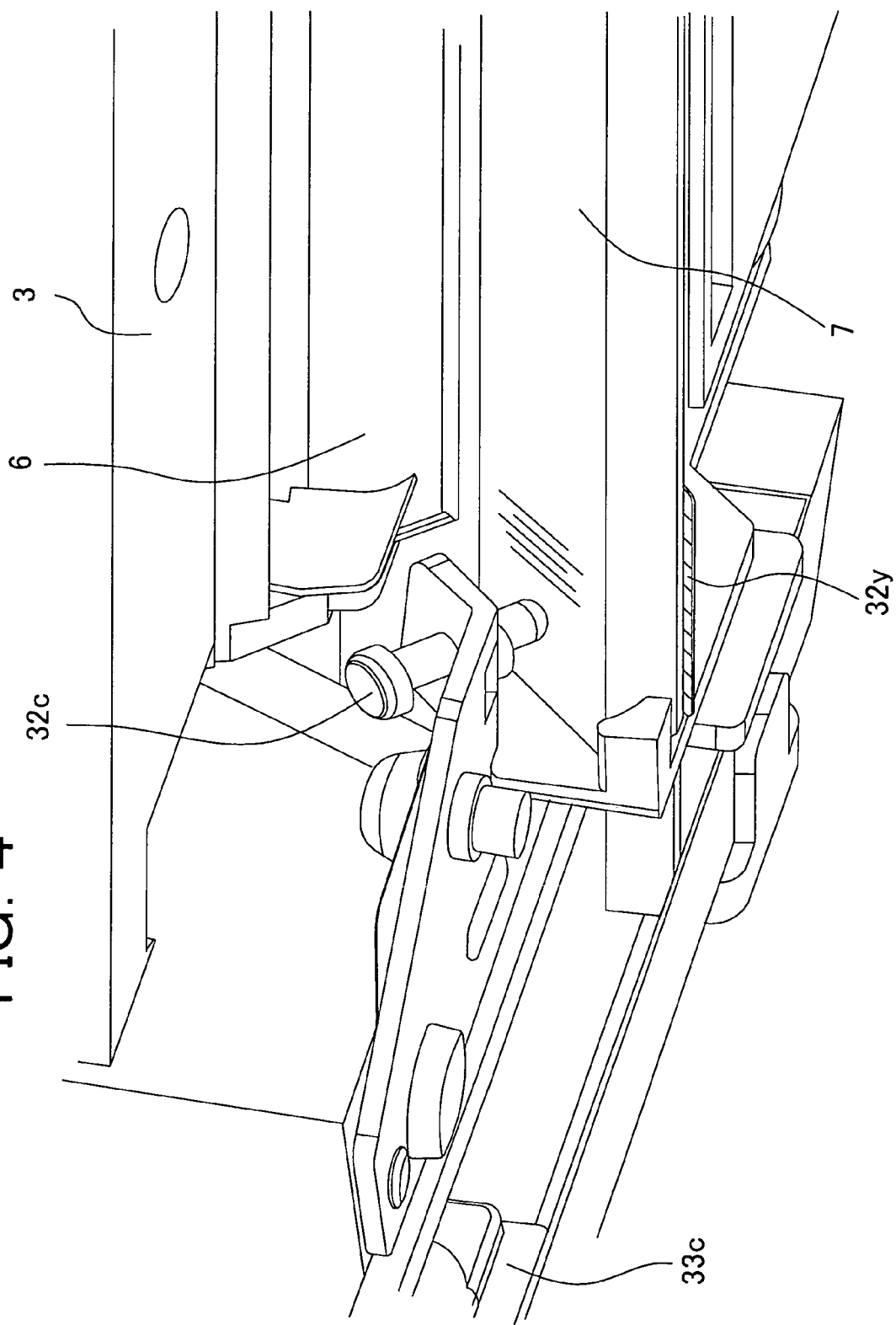

IMAGE READING APPARATUS

BACKGROUND OF THE INVENTION

The present invention relates to an image reading apparatus in a scanner apparatus for reading an image on an original sheet, or a complex apparatus such as a facsimile, copier and the like, and more particularly, to improvements in a carriage support structure for scanning an original sheet image on a platen.

Generally, this type of image reading apparatus is widely known as an apparatus in which a light source emits light to an original document set on a platen, and the reflected light from the original document is guided to a photoelectric conversion means (for example, CCD) to electrically read, and is universally used as an input apparatus of a computer, input apparatus of a computer network, facsimile apparatus, copier, and complex apparatus thereof.

Conventionally, for example, as disclosed in Japanese Laid-Open Patent Publication No. 2004-72538 (Document 1), the apparatus is comprised of a platen to mount and set an original document, a light source for emitting light to the original document on the platen, a read optical system for guiding the reflected light from the original document to a photoelectric conversion means, and a photoelectric conversion element. Then, the read optical system is configured so that the light source lamp and reflecting mirrors are installed in a carriage moving along the platen at a predetermined velocity, the light source emits light to an original document on the platen, and that the reflected light is deflected by the mirrors to be guided to the photoelectric conversion means via a lens.

As such a read optical system, for example, as disclosed in Japanese Laid-Open Patent Publication No. H11-352603 (Document 2), a configuration is known that two, first and second, carriages are arranged to move along the platen, and that the light source and first mirror are disposed in the first carriage, while second and third mirrors for guiding the light from the first mirror are disposed in the second carrier. Then, the carriages are moved in the relative relationship so that the movement amount of the second carriage is one-half the movement amount of the first carriage. It is known that such a configuration enables movement strokes of the carriages to be set short, and thereby enables the apparatus to be compact and small.

In such a configuration, the first and second carriages are made of, for example, resin in the shape of a rectangle frame having a platen width (length in the sub-scanning direction), and are installed with the light source, mirrors and others. Then, the first and second carriages are mounted and supported on right and left paired guide rails disposed on opposite side portions of the platen, and configured to move at predetermined velocities by driving means such as a wire, belt or the like coupled to a driving motor. The guide rails are formed of metal material such as, for example, channel steel of U-shaped cross section, resin including, for example, flanges integrally formed with the apparatus housing, or the like.

When the carriages installed with the mirrors for guiding the light from the original document to the reading means as described above are moved along the document surface set on the platen, it is necessary to guarantee equilibrium characteristics (traveling stability) of the mirrors. In other words, for either of reasons that one of right and left paired guide rails is tilted up or down with respect to the platen surface formed in flat plane, the carriage itself is formed with distortion, and that the carriage is manufactured with wrong dimensional accuracy, a problem arises that a geometrical error occurs in an optical path extending from the mirror to the reading means (element).

Therefore, conventionally, the position and angular attitude of the mirror are configured to be adjusted (first adjustment) in installing the mirror in the carriage, and after building the carriage on the guide rails to be supported, the height position is adjusted (second adjustment) so that the carriage is fitted to the rail faces without rattling.

For example, it is proposed in Patent Document 2 described above that sliders are provided at four, front, back, right and left, places to reliably engage the second carriage, which guides the light from the first mirror installed in the first carriage to the reading means, in the right and left rail faces in mounting and supporting the carriage on the left and right guide rails, and that a height position of each of the sliders is configured to be adjustable. Although the adjustment procedure is not disclosed in the Document, the height position of each of the first to fourth sliders is adjusted after installing the carriage in the guide rails. In thus adjusting the positions of the sliders at four, front, back, right and left, places to accurately align the position and angular attitude of the mirror, the time and skilled work is required for the adjustments.

Meanwhile, it is generally known that a carriage is configured to contact the rail faces in three points when the carriage installed with the mirror is mounted and supported on the rail faces with flatness ensured. In such a configuration where the right and left side portions of the carriage are supported by three points, as described in Patent Document 2 as mentioned above, it is pointed out that the carriage swings vertically on the one-point support portion side, and that fluctuations in image and noise occur due to the vibration. Therefore, it is proposed in Document 2 that the sliders to engage the carriage in the rail faces are disposed at two front and back places on right and left rail faces, and that the height position of each of the sliders is adjusted independently.

However, when the carriage installed with the mirror undergoes a position adjustment on the rail faces with a height adjustment mechanism (such as adjustment screws, etc.), the following problem arises. The height adjustment requires for the slides at four places to be brought into contact with the rail faces with equal contact pressure, concurrently with adjusting the heights so as not to cause a gap between the slider of the carriage and rail face. The contact pressure adjustment requires complicated adjustment work, and causes the problem that the angular attitude of the mirror becomes misaligned during this adjustment.

For example, when one of right and left rail faces is inclined, or the carriage becomes distorted, the angular attitude of the mirror may be varied due to the above-mentioned height position adjustment. By the height position adjustment for fitting the right and left edge portions of the carriage along the rail faces, the angular attitude of the mirror installed in the carriage may become misaligned. For example, when the angular attitude of the mirror becomes misaligned from 45 degrees to 46 degrees, the reading start position of the original document on the plate becomes geometrically misaligned (the reading finish position is the same.)

Therefore, the inventor of the invention reached an idea of adopting a structure that right and left side edge portions of a mirror are supported by three points in supporting the mirror on the carriage, and adjusting a height position of the carriage on the side edge portion side for pivotably supporting by one point in accordance with the rail face. By this means, it is possible to obtain the adjustment mechanism that the mirror position and angular attitude do not become misaligned (do not change) largely even when an accuracy error such as tilt or the like occurs in the rail face or sliding surface of the carriage.

It is a principal object of the invention to provide an image reading apparatus for facilitating an optical adjustment of a mirror in supporting a carriage installed with the mirror on right and left rail faces to enable the carriage to move along a platen.

BRIEF SUMMARY OF THE INVENTION

To attain the above-mentioned object, the present invention adopts configurations as described below. In an apparatus configuration where first and second carriages moving along an original document image on a platen at predetermined velocities guide reflected light from the original document to an image reading means, the first carriage supports one side edge portion of a mirror with first and second mirror support portions, and the other side edge portion with a third mirror support portion, and thus supports the mirror by three points. Then, opposite side edge portions of the first carriage are supported slidably on right and left paired rail members via slide members disposed at four right and left places including two front and back places. Then, a height position is configured to be adjustable in at least one of the slide members at two front and back places disposed on the third mirror support portion side for supporting the first mirror by one point.

An image reading apparatus according to the invention has a platen (2), first and second carriages (3, 4) moving along an original document image on the platen (2) at predetermined velocities, a light source (6) supported on the first carriage (3) to emit light to the original document image on the platen (2), a first mirror (7) supported on the first carriage (3) to deflect reflected light from the original document toward the second carriage (4), one or more second mirrors (8) supported on the second carriage (4) to guide the light from the first mirror (7) to an image reading means, and right and left paired rail members (5a, 5b) for supporting the first carriage (3) to enable the carriage (3) to move along the original document image on the platen (2). The first carriage (3) is provided with first and second mirror support portions (32a, 32c) for supporting one side edge portion of the first mirror (7) by two points having a predetermined distance therebetween in a carriage movement direction, and a third mirror support portion (32c) for supporting the other side edge portion by one point, the first mirror (7) is supported on the first, second and third mirror support portions by three points, the first carriage (3) is supported slidably at its opposite side edge portions respectively on the right and left paired rail members (5) via slide members (33) disposed at four right and left places including two front and back places having a predetermined distance therebetween in the carriage movement direction, and a height position is configured to be adjustable in at least one of the slide members (33c, 33d) at two front and back places disposed on the third mirror support portion (32c) side for supporting the first mirror (7) by one point.

A height adjustment screw (35) is provided in at least one of the slide members at two front and back places disposed on the third mirror support portion (32c) side for supporting the first mirror (7) by one point, and adjusts a height to bring the slide member into contact with a rail face (5x) of the rail member.

The slide members, which are at two front and back places disposed on the third mirror support portion (32c) side for supporting the first mirror (7) by one point, are disposed to come into contact with the rail face (5x) of the rail member at the front and back of the third mirror support portion as a center in the carriage movement direction.

The third mirror support portion (32c) is configured to pivotably support a substantially center portion of the first mirror by one point.

The second carriage (4) is slidably supported on the right and left paired rail members for movably supporting the first carriage (3), and supports two, second and third, mirrors for guiding the light from the first mirror (07) to the image reading means.

An image reading apparatus according to the invention has an apparatus housing (01), a platen (2) provided in the apparatus housing, an image reading means (11) disposed in the apparatus housing, first and second carriages (3, 4) moving along an original document image on the platen (2) at predetermined velocities, a light source (6) supported on the first carriage (3) to emit light to the original document image on the platen (2), a first mirror (7) supported on the first carriage (3) to deflect reflected light from the original document toward the second carriage (4), one or more second mirrors supported on the second carriage (4) to guide the light from the first mirror (7) to the image reading means (11) right and left paired rail members (5a, 5b) for supporting the first and second carriages (3, 4) to enable the carriages (3, 4) to move along the original document image on the platen (2), and a driving means (Mc) for moving each of the first and second carriages (4).

The first carriage (3) is provided with first and second mirror support portions (32a, 32b) for supporting one side edge portion of the first mirror (7) by two points having a predetermined distance therebetween in a carriage movement direction, and a third mirror support portion (32c) for supporting the other side edge portion by one point, the first mirror (7) is supported on the first, second and third mirror support portions by three points, the first carriage (3) is supported slidably at its opposite side edge portions respectively on the right and left paired rail members (5) via slide members (33) disposed at four right and left places including two front and back places having a predetermined distance therebetween in the carriage movement direction, and a height position is configured to be adjustable in at least one of the slide members at two front and back places disposed on the third mirror support portion side for supporting the first mirror (7) by one point.

The present invention provides an apparatus configuration where first and second carriages moving along an original document image on a platen at predetermined velocities guide reflected light from the original document to an image reading means, and the first carriage supports one side edge portion of a mirror with first and second mirror support portions, and the other side edge portion with a third mirror support portion, and thus supports the mirror with three points. Then, in slidably supporting opposite side edge portions of the first carriage on right and left paired rail members via slide members disposed at four right and left places including two front and back places, a height position is configured to be adjustable in at least one of the slide members situated on the third mirror support portion side for supporting the mirror by one point, and therefore, the invention produces the following effects.

When a carriage is slidably supported on right and left paired rail faces with slide members at four, front, back, right and left, places, the position and angular attitude of a mirror installed in the carriage may become misaligned in the relationship with flatness of the right and left rail faces and/or manufacturing accuracy of the carriage. In contrast thereto, in the invention, the height position is adjusted in the carriage side edge portion for supporting the mirror by one point in accordance with the rail face, and therefore, even when this height position adjustment causes tilt between front and back slide members, the position and angular attitude of the mirror do not become misaligned largely.

Accordingly, in the invention, in installing a mirror in a carriage, the mirror is installed in a predetermined position (design value) with reference to three points of the fixed slide members, thus making a first adjustment, and after assembling all the components in the carriage, the carriage is mounted and supported on the right and left paired rail faces. With the carriage engaged in the rail faces to be supported, the height position is adjusted in the carriage side edge portion for supporting the mirror by one point in accordance with the rail face, and a second adjustment is thus made. In this second adjustment, when the height position of one of the slide members situated at the front and back is adjusted to be higher or lower, the mirror is not inclined by the one-point support portion (third mirror support portion).

Thus, in the invention, since the first carriage is slidably supported on right and left paired rail faces with slide members at four left and right places including two front and back places, the carriage vibrates little, and is capable of obtaining stable smooth traveling operation for the long term. Concurrently therewith, the mirror position and angular attitude are made ease to adjust in the installation, and do not become misaligned during the use.

BRIEF DESCRIPTION OF THE SEVERAL VIEWS OF THE DRAWINGS

FIG. 4 is a perspective explanatory view showing a left edge portion of the mirror support structure in the apparatus of FIG. 2; and FIG. 5 contains explanatory views, where

DETAILED DESCRIPTION OF THE INVENTION

Figure 1:
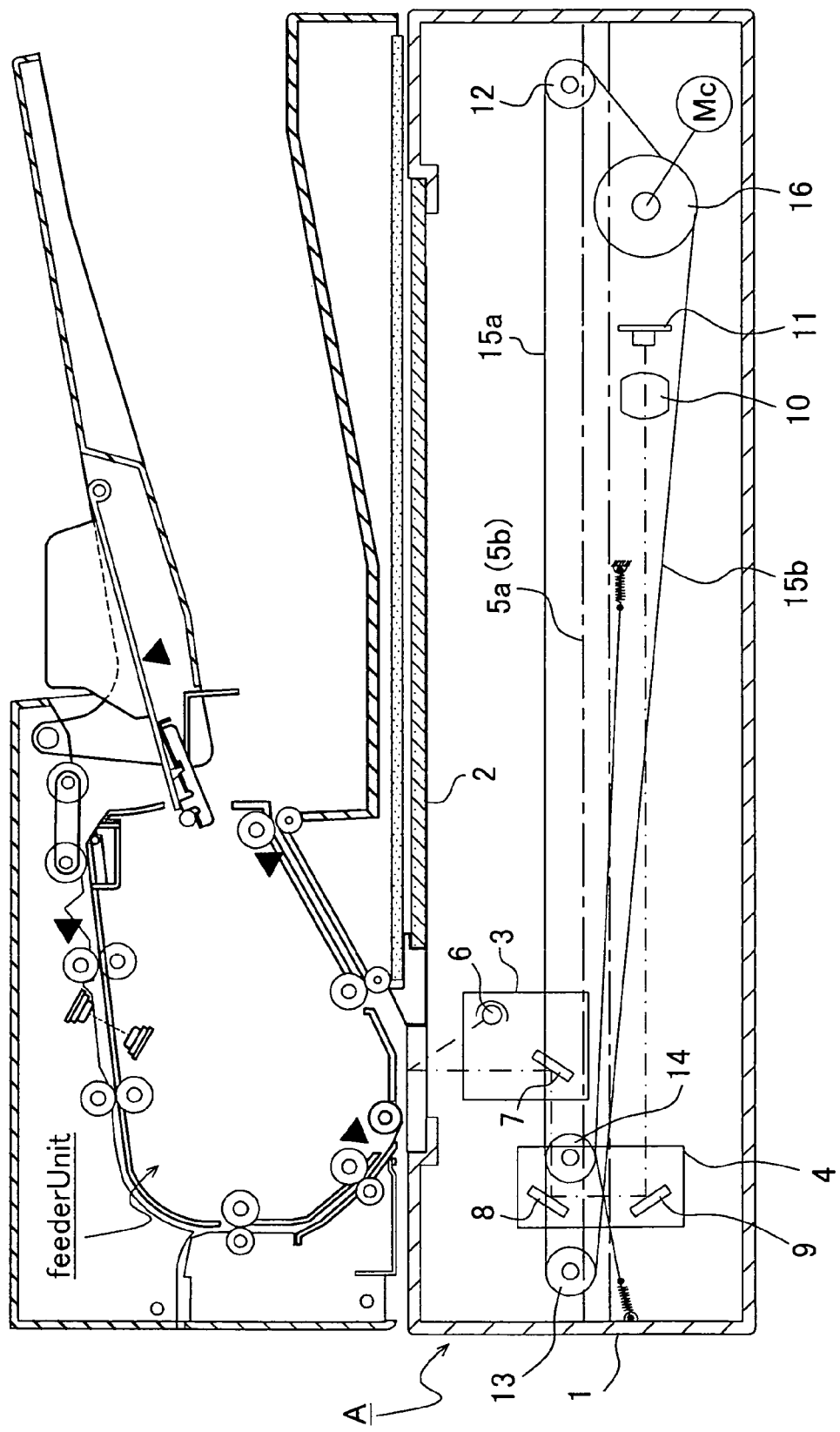
FIG. 1 is an explanatory view showing an entire configuration of an image reading apparatus according to the invention.
Figure 2:
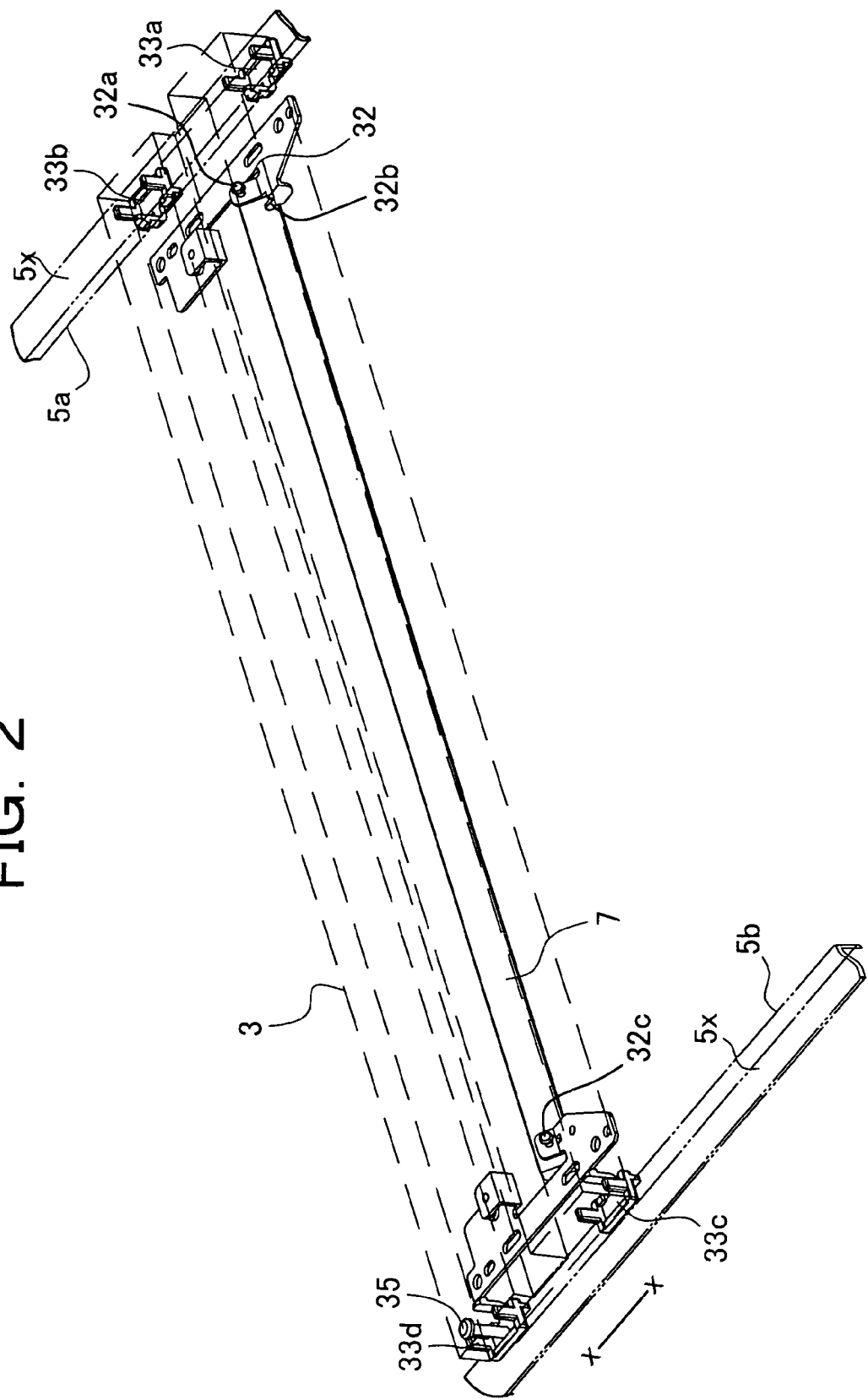
FIG. 2 is a perspective explanatory view showing a configuration of a first carriage in the apparatus of FIG. 1.
Figure 3:
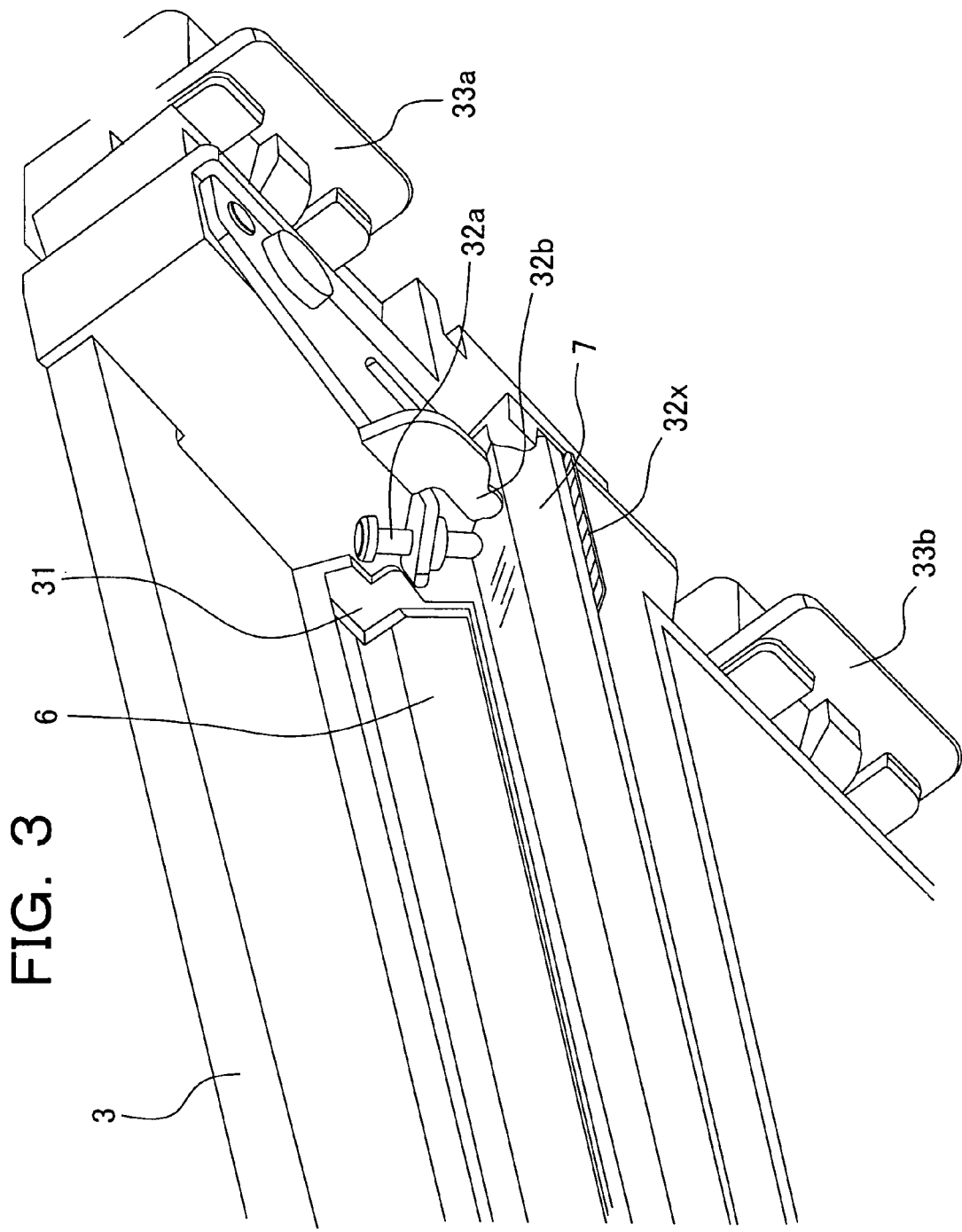
FIG. 3 is a perspective explanatory view showing a right edge portion of a mirror support structure in the apparatus of FIG. 2.

The present invention will specifically be described below based on preferred embodiments as shown in accompanying drawings. FIG. 1 shows an entire explanatory view of an image reading apparatus adopting the invention, and FIG. 2 is a perspective view of a carriage. FIGS. 3 and 4 are explanatory views of a carriage support structure, and FIG. 5 contains operation state explanatory views of the carriage support structure.

Described below is an image reading apparatus A according to the invention as shown in FIG. 1. The apparatus as shown in the figure shows a scanner apparatus used as an input apparatus of a computer or the like. A casing 1 formed in an appropriate shape is provided on its top with a platen 2 made of glass or the like. Then, inside the casing 1, a first carriage 3 and second carriage 4 reciprocating along the platen 2 laterally in FIG. 1 are supported on guide rails 5. Then, in the first carriage 3 are installed a light source lamp 6 for emitting light to an original document on the platen, and a first mirror 7 for guiding the reflected light from the original document to an image reading means 11 as described later.

Further, in the second carriage 4 are installed a second mirror 8 and third mirror 9 for guiding the light from the first mirror 7 to the image reading means 11. Meanwhile, on the bottom of the casing 1 is disposed the image reading means 11 formed of a lens 10 and photoelectric conversion element. These optical elements form a read optical system where the reflected light of the light emitted from the light source lamp 6 is deflected by the first mirror 7 in the second carriage direction, and the deflected light is guided to the image reading means 11 by the second mirror 8 and third mirror 9 via the lens 10.

[First Carriage]

The first carriage 3 is formed of a frame body having a predetermined length in the width direction of the platen 2 as a perspective structure shown in FIG. 2, and is provided with a lamp storage portion 31 of the light source lamp 6 and a mirror storage portion 32 of the first mirror 7. The first carriage 3 shown in the figure is formed of heat-resistant resin, and is integrally formed with the lamp storage portion 31 and mirror storage portion 32. The light source lamp 6 is formed of a linear light source such as a fluorescent lamp, xenon lamp or the like having a width size of a maximum original. Then, a socket is prepared in the lamp storage portion 31, and the light source lamp 6 is fixed and supported onto this storage portion.

The first carriage 3 is provided with the mirror storage portion 32, and the first mirror 7 is supported on first, second and third mirror support portions 32a, 32b, 32c provided in the storage portion 32. The first mirror 7 is formed in the shape of a rectangle having the width size of the maximum original as shown in FIG. 2, and the right edge portion (right end as viewed in FIG. 2) of the mirror 7 is supported on the first mirror support portion 32a and second mirror support portion 32b having a distance L1 (see FIG. 4) in the carriage movement direction (x-x direction in FIG. 2). Further, the left edge portion (left end as viewed in FIG. 2) of the mirror 7 is supported on the third mirror support portion 32c at its center portion in the carriage movement direction. In this way, the first mirror 7 is supported at its one edge portion (right edge portion in FIG. 2) by two points, wile being supported at its other edge portion (left edge portion in FIG. 2) by one point. Then, the first mirror support portion 32a and third mirror support portion 32c are formed of adjustment screws to enable the support point (contact point) of the mirror to be adjusted in position. 32x and 32y shown in the figure denote plate springs for pressing the back side of the mirror on the side opposite to the mirror support portions.

By the aforementioned configuration, in the first carriage 3 and the first mirror 7 that were manufactured in separate processes, it is possible to adjust the position and angular attitude of the first mirror 7 (first adjustment as described later) by adjusting the positions of the first and third mirror support portions 32a, 32c with reference to the second mirror support portion 32b integrally-formed with the carriage. In this adjustment, the position and angular attitude of the first mirror 7 are adjusted with a tool using slide members 33 described later as a reference, for example, in the apparatus assembly process. Further, the third mirror support portion 32c is situated to be positioned in the center portion of a distance L2 formed between a third slide member 33c and fourth slide member 33d.

As shown in FIG. 2, in the first carriage 3, four slide members 33a to 33d are disposed in opposite side edge portions of the platen 2. The slide members 33 are to bring the first carriage 3 into slide-contact with rail faces of guide rails 5a, 5b as described later. Therefore, in the right side edge portion, viewed in FIG. 2, of the first carriage 3 are disposed the first slide member 33a and second slide member 33b having the distance L2, and similarly, in the left side edge portion of the first carriage 3 are disposed the third slide member 33c and fourth slide member 33d having the distance L2.

Then, it is a feature of the invention that a height position is configured to be adjustable in at least one of the third slide member 33c and fourth slide member 33d situated (in the left side edge portion in FIG. 2) on the carriage side edge portion for supporting the first mirror 7 by one point (third mirror support portion). Therefore, the slide members 33 shown in the figure are formed of members different from the first carriage 3, made of resin such as nylon, Teflon or the like relatively rich in smoothness, and configured to enable the height position of the slide member 33 to be adjusted with an adjustment screw 35. In addition, the first, second and third slide members 33a to 33c may be integrally formed with the first carriage 3, or formed of different members and engaged in concave portions formed in the carriage to couple as shown in the figure.

[Second Carriage]

The second carriage 4 is formed by resin molding as in the first carriage 3, and provided with two mirror storage portions 41 and 42. Then, the second mirror 8 is fixed and supported onto the first mirror storage portion 41, while the third mirror 9 is fixed and supported onto the second mirror storage portion 42. The second carriage 4 is provided with four slide members 43a to 43d as in the first carriage 3 as described previously.

[Guide Rail Structure]

The guide rails 5 slidably supporting the first carriage 3 and second carriage 4 are disposed in the casing 1. The guide rails 5 are formed of a first guide rail 5a and second guide rail 5b disposed in opposite side edge portions of the platen 2 in parallel with each other, and are provided on their top with rail faces 5x. Then, the guide rails 5 are made of metal material or resin material. In addition, in the invention, the rail face 5x for supporting the first carriage 3 and the rail face 5x for supporting the second carriage 4 may be formed of a single rail member or may be formed of a plurality of rail members separately.

[Carriage Driving Mechanism]

The first carriage 3 and second carriage 4 are slidably engaged and supported in the first and second guide rails 5a, 5b, and are configured that the second carriage 4 reciprocates at the velocity one-half the moving velocity of the first carriage 3. Their driving mechanism is as shown in FIG. 1. In the casing 1 are disposed first and second pulleys 12, 13 that are a pair of right and left pulleys, and the second carriage 4 is provided with an intermediate pulley (movable pulley) 14. Then, a first wire 15a with its one end fixed to the frame (not shown) of the casing 1 as appropriate is wound around the intermediate pulley 14 of the second carriage 4, then fixed to the first carriage 3, and coupled to a wind-up pulley 16 via the first pulley 12. Similarly, a second wire 15b with its one end fixed to the frame is wound around the intermediate pulley 14, further wound around the second pulley 13, and coupled at its other end to the wind-up puller 16. Therefore, when the wind-up pulley 16 is rotated forward and backward by a carriage driving motor Mc, the first carriage 3 moves to the right and left along the platen 2 at a predetermined velocity, and concurrently therewith, the second carriage 4 moves to the right and left at the one-half velocity.

[Position Adjustment of the First Mirror]

As described above, the first mirror 7 is supported on the first, second and third mirror support portions 32a, 32b, 32c in the carriage 3 by three points, and the first carriage 3 is engaged and supported in the right and left paired guide rails 5a, 5b slidably with the first, second, third and fourth slide members 33a to 33d. Then, the fourth slide member 33d situated at the left side edge portion in FIG. 2 for supporting the first mirror 7 by one point is configured to enable its height position to be adjusted with the adjustment screw 35.

Descriptions are given to adjustments of the position and angular attitude of the first mirror 7. For example, the first carriage 3 formed by resin molding and the first mirror 7 formed of glass are separately formed by different processes, and manufactured with respective predetermined processing accuracies. Similarly, the second carriage 4, second mirror 8, third mirror 9, lens 10 and others are manufactured.

Then, the first mirror 7 and light source lamp 6 are installed in the first carriage 3, where each member was manufactured in the different process, and the slide members 33 (33a to 33d) are further installed in the first carriage 3. Then, the slide member 33 is mounted on the adjustment tool having the reference surface (flat plane). At this point, on the reference surfaces are mounted and set the first, second and third slide members 33a to 33c except the fourth slide member 33d adjustable in height position. In this state, with respect to the position and angular attitude of the first mirror 7, the first and third mirror support portions (adjustment screws) 32a, 32c are adjusted in position with reference to the second mirror support portion (projection) 32b. By this means, the first mirror 7 is positioned in the accurate position in the first carriage 3 with reference to rail mating faces of the first, second and third slide members 33a, 33b, 33c. Thus, for example, in the manufacturing process of the apparatus, the position adjustment (first adjustment) is made to the first mirror 7.

Next, after all the assembly processes, the first carriage 3 is mounted and set on the rail faces 5x of the guide rails 5. Then, after the first and second wires 15a, 15b are laid over the first carriage 3, the height position of the fourth slide member 33d is adjusted with the adjustment screw 35 so that the first, second, third and fourth slide members 33a to 33d slide-engage in the right and left rail faces 5x with reliability.

Figure 5A:
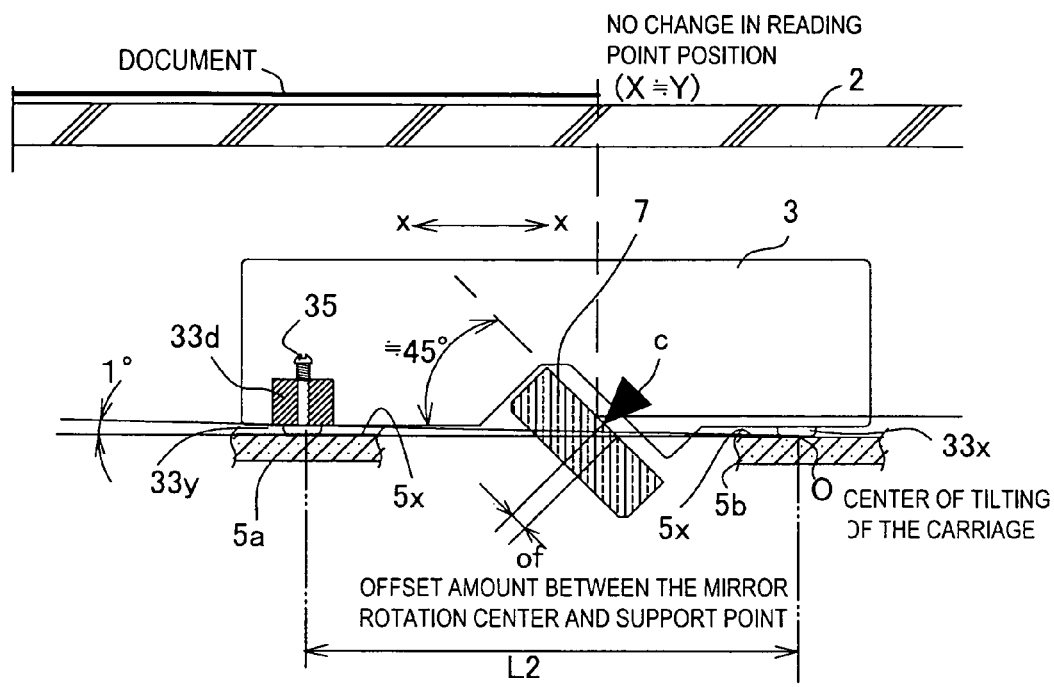
FIG. 5(a) shows a height adjustment of the first carriage in the apparatus of FIG. 2.

At this point, when one of the right and left rail faces 5x is inclined, or due to manufacturing accuracy of the first carriage 3, the fourth slide member 33d may float from the rail face 5x. When a gap Ga occurs between the slide member 33 and rail face 5x due to such an accuracy error, as shown in FIG. 5(a), the height is adjusted with the adjustment screw 35 of the fourth slide member 33d. At this point, with respect to the height adjustment amount h, when h=Ga, the slide members 33a to 33d at four places uniformly come into slide-contact with the rail faces 5x, and the contact pressure with the rail face 5x is equal at four points. By this height adjustment, however, it sometimes happens that h>Ga or h<Ga. This is caused by the fact that the first carriage 3 becomes elastically deformed and distorted. In other words, the height adjustment by the adjustment screw 35 should be made to compensate for the gap Ga, and at the same time, to bring the slide members 33 at four places into contact with the rail faces 5x with the equal pressure. When the contact pressure of the fourth slide member 33d is smaller than those at the other three points, vibration and noise occurs when the first carriage 3 moves. On the other hand, when the contact pressure is larger, distortion occurs in the first carriage 3, and prevents smooth movement of the carriage.

Figure 5B:
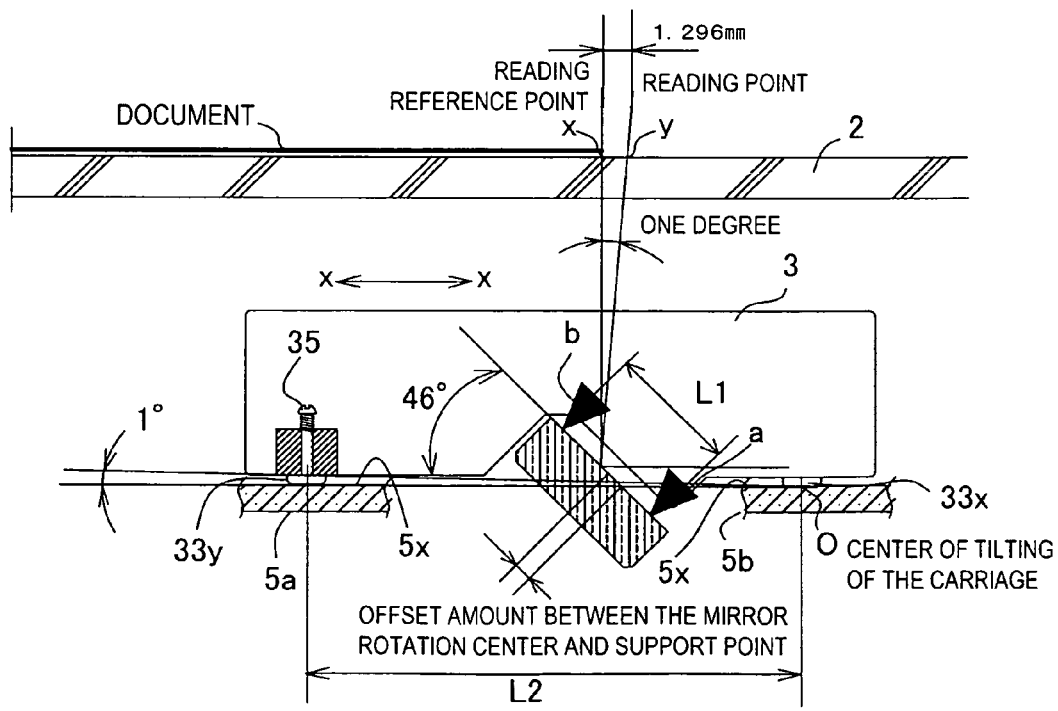
FIG. 5(b) shows a case that a mirror is supported by two points.

In such a height adjustment of the fourth slide member 33d, in the invention, the first mirror 7 is supported on the third mirror support portion 32c by one point on the side edge portion of the carriage where the fourth slide member 33d is situated. Therefore, as shown in FIG. 5(b), the position and angular attitude of the first mirror 7 are not changed largely. This relationship will be described by comparing with the case of two-point support as shown in FIG. 5(b). FIG. 5(b) shows the case of supporting the first mirror 7 in two points, a point and b point. For example, when two slide members 33x, 33y are installed on the rail face 5x while tilting one degree therebetween, the first mirror 7 set for 45 degrees is inclined approximately 46 degrees. At this point, the image reading point of the platen surface is changed from X in FIG. 5(b) (at the time of 45 degrees) to Y in FIG. 5(b) (at the time of 46 degrees) due to the inclination of the mirror. The distance between X and Y is 1.296 mm (in the case of the embodiment as shown in the figure), and the reading position of the original document on the platen 2 is largely displaced. Therefore, it is necessary to move the position of the mirror. This mirror position correction means making again the first adjustment of the mirror position in the manufacturing process as described previously, and requires extremely complicated work needing skill. Such a position displacement of the reading position occurs similarly due to distortion deformation of the carriage caused by changes in environmental temperature and/or long-term usage, and in this case, the user is not able to adjust the position with ease.

In contrast thereto, in the case that the first mirror 7 is supported by one point (c point shown in the figure) of the third mirror support portion 32c as shown in FIG. 5(a), for example, even when two slide members 33x, 33y are installed while tilting one degree therebetween, the mirror is held at substantially 45 degrees. Accordingly, with respect to the image reading point in this case, the reading point Y is positioned in the position substantially in accordance with the reference position X. In addition, also in this case, when the slide member 33 is inclined about O point as the center shown in the figure, the mirror is slightly inclined from 45 degrees in the case that a position displacement (offset amount of shown in the figure) occurs between the mirror support point, c point, and the tilting line, but the position displacement of the reading position Y due to the inclination affects image reading little. In this case, by setting the mirror support point in a geometrical position such that the offset amount shown in the figure does not arise, it is possible to eliminate the position displacement of the reading point almost completely.

In addition, this application claims priority from Japanese Patent Application No. 2008-163074 incorporated herein by reference.

What is claimed is:

1. An image reading apparatus comprising:
a platen;
first and second carriages moving along an original document image on the platen at predetermined velocities;
a light source supported on the first carriage to emit light to the original document image on the platen;
a first mirror supported on the first carriage to deflect reflected light from the original document toward the second carriage;
one or more second mirrors supported on the second carriage to guide the light from the first mirror to image reading means; and
right and left paired rail members for supporting the first carriage to enable the first carriage to move along the original document image on the platen,
wherein the first carriage is provided with first and second mirror support portions for supporting one side edge portion of the first mirror by two points having a predetermined distance therebetween in a carriage movement direction, and a third mirror support portion for supporting the other side edge portion by one point,
the first mirror is supported on the first, second and third mirror support portions by three points,
the first carriage is supported slidably at its opposite side edge portions respectively on the right and left paired rail members via slide members disposed at four right and left places including two front and back places having a predetermined distance therebetween in the carriage movement direction, and
a height position is configured to be adjustable in at least one of slide members at two front and back places disposed on the third mirror support portion side for supporting the first mirror by one point.

2. The image reading apparatus according to claim 1, wherein a height adjustment screw is provided in the at least one of slide members at two front and back places disposed on the third mirror support portion side for supporting the first mirror by one point, and adjusts a height to bring the slide member into contact with a rail face of the rail member.

3. The image reading apparatus according to claim 1, wherein the slide members, at two front and back places disposed on the third mirror support portion side for supporting the first mirror by one point, are disposed to come into contact with a rail face of the rail member at the front and back of the third mirror support portion as a center in the carriage movement direction.

4. The image reading apparatus according to claim 1, wherein the third mirror support portion is configured to pivotably support a substantially center portion of the first mirror by one point.

5. The image reading apparatus according to claim 1, wherein the second carriage is slidably supported on the right and left paired rail members for movably supporting the first carriage, and supports two, second and third, mirrors for guiding the light from the first mirror to the image reading means.

6. An image reading apparatus comprising;
an apparatus housing;
a platen provided in the apparatus housing;
image reading means disposed in the apparatus housing;
first and second carriages moving along an original document image on the platen at predetermined velocities;
a light source supported on the first carriage to emit light to the original document image on the platen;
a first mirror supported on the first carriage to deflect reflected light from the original document toward the second carriage;
one or more second mirrors supported on the second carriage to guide the light from the first mirror to the image reading means;
right and left paired rail members for supporting the first and second carriages to enable the carriages to move along the original document image on the platen; and
driving means for moving each of the first and second carriages, wherein the first carriage is provided with first and second mirror support portions for supporting one side edge portion of the first mirror by two points having a predetermined distance therebetween in a carriage movement direction, and a third mirror support portion for supporting the other side edge portion by one point, the first mirror is supported on the first, second and third mirror support portions by three points, the first carriage is supported slidably at its opposite side edge portions respectively on the right and left paired rail members via slide members disposed at four right and left places including two front and back places having a predetermined distance therebetween in the carriage movement direction, and a height position is configured to be adjustable in at least one of slide members at two front and back places disposed on the third mirror support portion side for supporting the first mirror by one point.

* * * * *